July 12, 1949.　　　F. F. DAUENHAUER　　　2,475,823
PETAL SAVER AND HOP CLEANER

Filed April 10, 1945　　　　　　　　　　2 Sheets-Sheet 1

INVENTOR.
FLORIAN F. DAUENHAUER
BY
*Munn, Liddy & Glaccum*
ATTORNEYS

July 12, 1949.　　　F. F. DAUENHAUER　　　2,475,823
PETAL SAVER AND HOP CLEANER
Filed April 10, 1945　　　　　　　　　　2 Sheets-Sheet 2
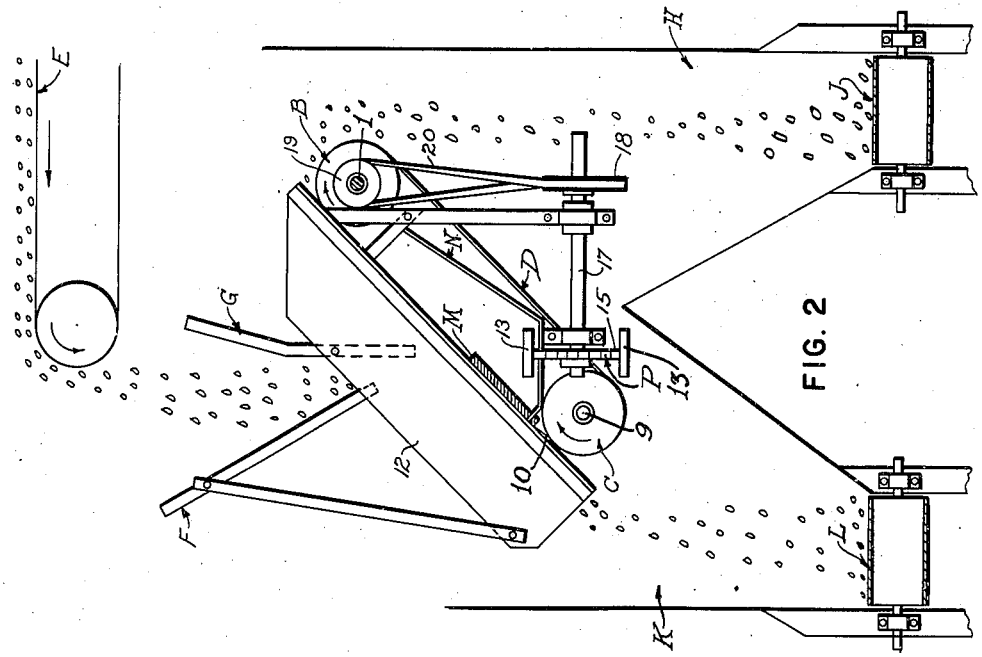
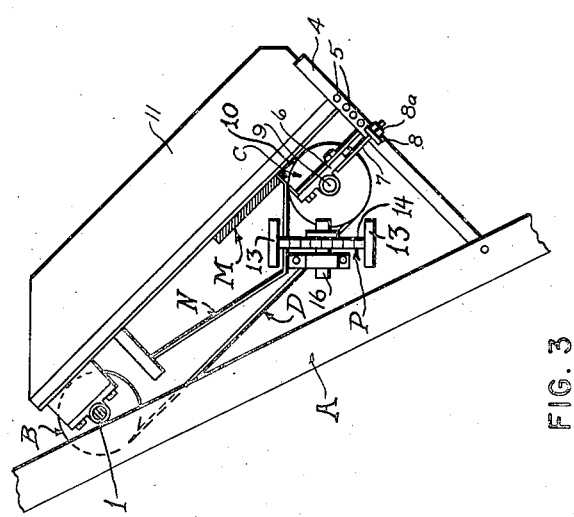
INVENTOR.
FLORIAN F. DAUENHAUER
BY
Munn, Liddy & Glaccum
ATTORNEYS Patented July 12, 1949

2,475,823

UNITED STATES PATENT OFFICE 2,475,823

PETAL SAVER AND HOP CLEANER

Florian F. Dauenhauer, Santa Rosa, Calif.

Application April 10, 1945, Serial No. 587,525

3 Claims. (Cl. 209—12)

1

The present invention relates to improvements in a petal saver and hop cleaner and it consists of the combinations, constructions and arrangements hereinafter described and claimed and in the steps hereinafter set forth.

A hop is round and cone-shaped and is made up of a series of petals similar to those of a flower. The petals are concave and oval-shaped. In the picking of hops, some of the petals are broken off. It is necessary to separate the petals from the hop leaves and save the petals with the hops while discarding the leaves and stems. In the usual method of separating hops from the leaves, the petals are carried away by the discarded leaves and stems are lost.

The principal object of my invention is to provide a petal saver and hop cleaner which operates on the gravity principle and which will separate the loose petals from the leaves and convey both the separated petals and the hops to a given point and discard the leaves and broken stems.

A further object of my invention is to provide a device of the type described which is thoroughly efficient for the purpose of separating leaves from the broken petals and hops and which is continuous in operation.

Other objects and advantages will appear in the following specification, and the novel features of the device will be particularly pointed out in the appended claims.

My invention is illustrated in the accompanying drawings forming a part of this application, in which:

Figure 2 is a transverse section taken substantially along the line 2—2 of Figure 1, portions of the device being shown diagrammatically;

Figure 3 is a transverse section taken substantially along the line 3—3 of Figure 1.

While I have shown only the preferred form of my invention, it should be understood that various changes or modification may be made within the scope of the appended claims without departing from the spirit and scope of the invention.

In carrying out my invention I provide a frame indicated generally at A and this frame carries a drive shift 1 that is mounted in bearings 2 that are secured to the frame members A. A drive sprocket 3 is mounted on the shaft 1 and may be driven by a sprocket chain that connects with any source of power for imparting a rotative movement to the shaft.

Figure 1:
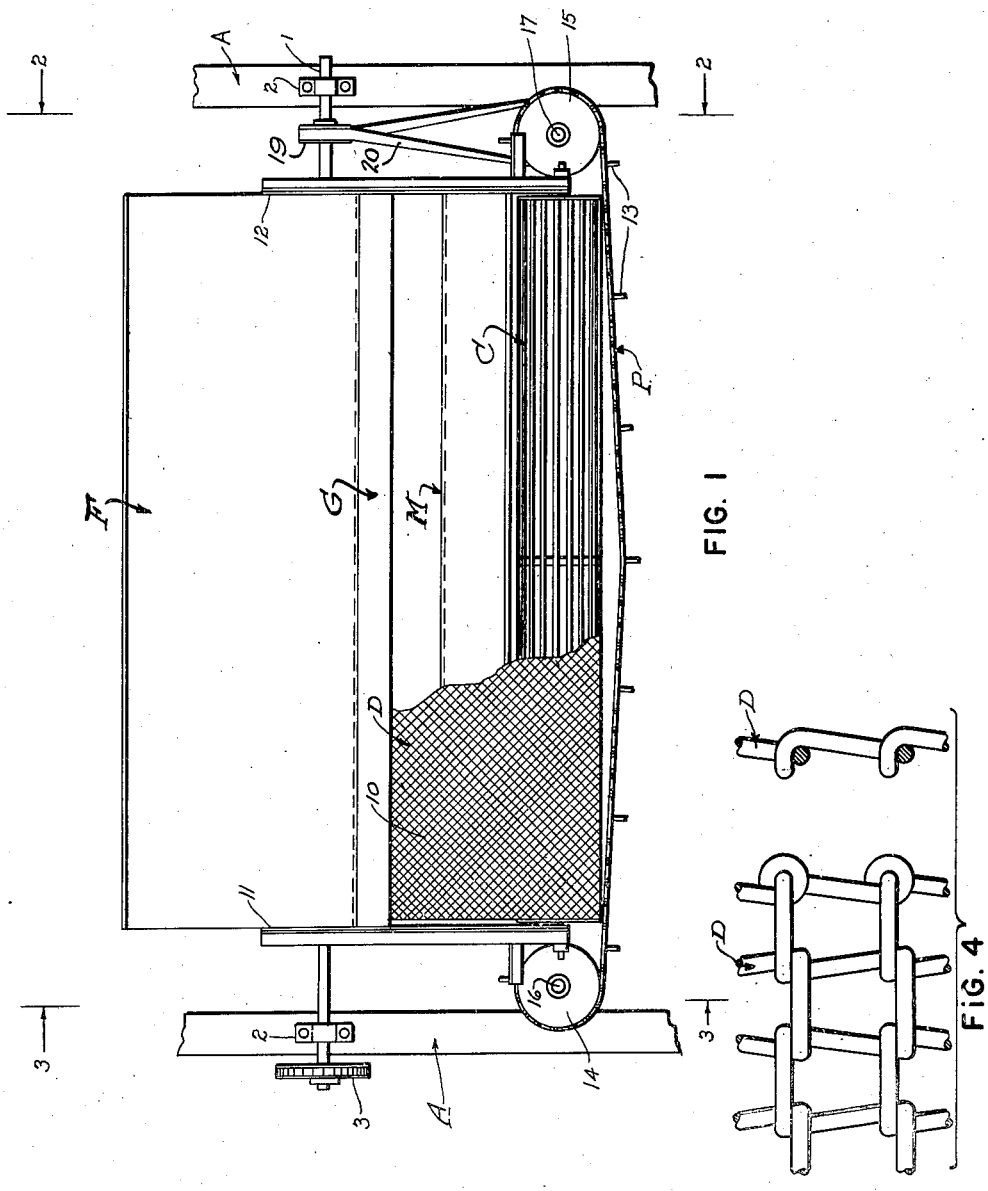
Figure 1 is a front elevation of the device, portions being broken away for clarity.

Figure 2 shows the drive shaft 1 carrying an upper cylinder B. The cylinder is relatively long in length and is keyed to the shaft so as to be rotated thereby. Figure 3 shows the frame A provided with a supporting member 4 that has a plurality of openings 5 therein. Each frame member A shown in Figure 1 is provided with the member 4 although I only show the member in Figure 3 and do not show it in Figure 2. A bearing 6 is adjustably secured to the support 4 by means of an L bolt 7. The bolt 7 extends through a member 8 that is adjustably supported in any one of the openings 5. A nut 8a may be tightened on the bolt for moving a shaft 9 carried by the bearing toward the member 4.

Figure 4:
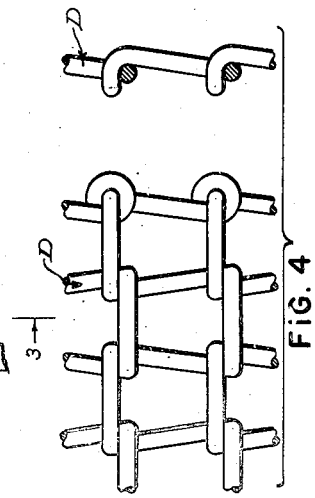
Figure 4 shows a plan and sectional views of a portion of the screen mesh conveyor used with my device.

There are two bearings 6 and two supports 4 for rotatably carrying the shaft 9. A lower cylinder C is mounted on the shaft 9 and a wire mesh endless screen belt indicated generally at D and shown in detail in Figure 4, is passed around the upper and lower cylinders B and C so that the upper reach 10 of the belt extends at an angle to the horizontal as clearly shown in both Figures 2 and 3. A rotation of the shaft 1 will rotate the cylinder B and the cylinder in turn, will cause the endless screen belt D to move around both upper and lower clinders B and C. The screen D is shown and claimed in my copending application, Serial No. 575,374, filed January 31, 1945, which has become abandoned.

Side boards 11 and 12 are arranged along the edges of the upper wire screen reach 10 so as to confine the picked hops and leaves on the upper reach 10 that are delivered thereto by an endless feed conveyor indicated diagrammatically at E, in Figure 2. The angle of the screen D can be controlled by placing the member 8 in the desired opening 5. A front baffle board F and a rear baffle board G, see Figure 2, guide the picked hops and leaves onto the upper screen reach 10. The two baffle boards tend to flatten the leaves as they pass therebetween and to arrest their falling speed prior to the leaves actually striking the screen portion 10. The leaves fall upon the mesh belt D with a minimum of momentum while the heavier hops strike the upper belt reach 10 and roll over the surface of the screen and are thus separated from the leaves.

The cylinders B and C rotate in a clockwise direction when looking at Figure 2 and therefore the upper screen reach 10 will move upwardly and will carry the leaves to the top of the cylinder B where they will be discharged into a chute H which will convey them to an endless conveyor shown diagrammatically at J. The hops will roll downwardly over the inclined screen since their size is too large to permit them to fall through the screen meshes. The hops will leave the lower end of the belt and be discharged into a chute K that will guide them to a hop conveyor shown diagrammatically at L.

It will be noted from both Figures 2 and 3 that I provide a back board M and dispose this board under the upper screen reach 10 so that the hops as they fall down upon the screen will be prevented from becoming enmeshed in the screen openings due to the board stopping the hops from partially passing through the screen openings. Since the board does not permit the hops to extend through the screen mesh a distance sufficient for the hops to be engaged by the screen wires, the hops will roll freely over the screen surface. The back board in this way prevents the hops from being conveyed upwardly by the screen even though the upper reach 10 continuously moves in an upward direction.

The petals of the hops which are broken off, are small enough to drop through the wire mesh openings in the screen D after the petals have passed the upper edge of the back board M. The petals will drop into a petal trough N and the trough will convey the petals to a sprocket chain P that carries transversely extending paddles 13, see Figure 1. The sprocket chain P is passed around sprockets 14 and 15 which are mounted on stub shafts 16 and 17.

Figure 2 shows the shaft 17 extending rearwardly and carrying a pulley 18 that is operatively connected to a pulley 19 mounted on the drive shaft 1. A belt 20 interconnects the two pulleys 18 and 19 and this will cause the drive shaft 1 to rotate the shaft 17 and move the sprocket chain P. The upper reach of the sprocket chain carries its paddles 13 along the lower end of the petal trough and removes the petals from the trough and drops them into the chute K. The chute conveys the petals to the conveyor L which also receives the hops. In this way the petals and hops are separated from the leaves.

The detail of the screen belt D is illustrated in Figure 4. The screen has rectangularly-shaped openings too small for the hops and leaves to pass through, but large enough to permit the hop petals to pass through. The screen sections extend transversely across the belt and can pivot with respect to each other so that the screen can be passed around the cylinders. The screen is a flat weave mesh and the rectangular openings are parallel to the line of travel. The mesh is self cleaning and the links form ribs that extend transversely across the screen belt. The ribs stop the leaves from sliding. My co-pending application on a screen type conveyor, Serial No. 575,374, explains the structure of the screen in detail and no further description need be given.

From the foregoing description of the various parts of the device, the operation thereof may be readily understood. The hops are mixed with leaves and petals during picking. Figure 2 shows the picked hops and leaves being fed to my device by the endless conveyor belt E. The hops and leaves are dropped between the baffle boards F and G which converge at their lower ends to flatten the leaves and arrest their falling speed. The leaves fall upon the belt D and flatten against the wire mesh where they are too large to pass through the screen mesh of the belt. The upper belt reach which receives the leaves is continuously moving upwardly and will carry the leaves therewith and will discharge them into the chute H and onto the endless conveyor J.

The hops, being round, will strike the upper reach 10 and roll down the inclined portion to the chute K where they will be delivered to the endless conveyor L. The back board M prevents the hops from becoming impinged in the wire screen mesh of the belt D and being carried upwardly and discharged into the chute H. The petals are smaller than the leaves and will drop through the wire mesh into the trough N and be delivered to the chute K by the continuously moving paddles 13 carried by the sprocket chain P. In this way the hops and petals are continuously separated from the leaves.

I claim:

1. A device of the type described comprising an endless screen having an upper reach upwardly inclined and a lower reach; means for moving the screen portion forming the upper reach in an upward direction; means for delivering picked hops mixed with leaves and hop petals onto the upper reach, said means including means for flattening the hop leaves so that they will lie substantially flat on the upper reach when striking it; the mesh of the screen being too small to permit hops or hop leaves from passing therethrough, but large enough to permit hop petals to pass therethrough; whereby the hops will roll off the lower end of the upper reach and the hop leaves will be discharged over the upper end and thus be separated; means placed between the two reaches of the endless screen for combining the hop petals that pass through the upper reach of the screen with the hops that roll off the lower end of the upper reach, and means placed under the portion of the upper reach that receives the hops from the hop delivery means for preventing the hops from partially passing through the screen mesh and becoming embedded in the screen.

2. A device of the type described comprising an endless screen belt having its upper reach lying in an inclined plane; means for feeding hops mixed with leaves and hop petals to the upper reach; means for imparting continuous movement to the belt so that the upper reach belt portion will move upwardly; means disposed between the feeding means and the upper reach for flattening the leaves so that they will lie substantially flat on the upper reach when striking it; the screen belt mesh being too small to permit the hops or leaves to pass therethrough but large enough to permit the petals to pass therethrough, a back board under the upper reach portion where the hops are received for preventing the hops from embedding themselves in the mesh whereby the hops will roll down the upper reach and be discharged therefrom, the leaves being discharged at the other end of the upper reach; a trough placed between the two reaches of the screen for receiving the petals that sift through the mesh of the upper reach; and means for removing the petals from the trough and delivering them to the separated hops.

3. A device of the type described comprising an endless screen belt having its upper reach lying in an inclined plane; means for feeding hops mixed with leaves and hop petals to the upper reach; means for imparting continuous movement to the belt so that the upper reach belt portion will move upwardly; means disposed between the feeding means and the upper reach for flattening the leaves so that they will lie substantially flat on the upper reach when striking it; the screen belt mesh being too small to permit the hops or leaves to pass therethrough but large enough to permit the petals to pass therethrough, a back board under the upper reach portion where the hops are received for preventing the hops from embedding themselves in the mesh whereby the hops will roll down the upper reach and be discharged therefrom, the leaves being discharged at the other end of the upper reach; a trough for receiving the petals that sift through the mesh of the upper reach; and means for removing the petals from the trough and delivering them to the separated hops, said last-named means including an endless sprocket chain, with transversely extending paddles, and means for moving the chain for causing the paddles to wipe the trough for removing petals therefrom.

FLORIAN F. DAUENHAUER.

REFERENCES CITED

The following references are of record in the file of this patent:

UNITED STATES PATENTS

| Number | Name | Date |
|---|---|---|
| 693,026 | Jessup | Feb. 11, 1902 |
| 1,132,011 | Horst | Mar. 16, 1915 |
| 2,050,458 | Ovestrud et al. | Aug. 11, 1936 |
| 2,138,529 | Thys | Nov. 29, 1938 |
| 2,226,009 | Miller | Dec. 24, 1940 |
| 2,228,977 | Rogers | Jan. 14, 1941 |

FOREIGN PATENTS

| Number | Country | Date |
|---|---|---|
| 516,822 | Great Britain | Jan. 12, 1940 |